US012525175B2

(12) United States Patent
Kim et al.

(10) Patent No.: US 12,525,175 B2
(45) **Date of Patent: *Jan. 13, 2026**

(54) DISPLAY DEVICE AND METHOD FOR DRIVING THE SAME

(71) Applicant: Samsung Display Co., LTD., Yongin-si (KR)

(72) Inventors: Mingyu Kim, Yongin-si (KR); Huisu Kim, Yongin-si (KR); Seyun Kim, Yongin-si (KR); Seungho Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,256

(22) Filed: Jun. 1, 2024

(65) Prior Publication Data

US 2025/0124853 A1 Apr. 17, 2025

(30) Foreign Application Priority Data

Oct. 13, 2023 (KR) ........................ 10-2023-0136601

(51) Int. Cl.
*G09G 3/32* (2016.01)
*G09G 3/20* (2006.01)

(52) U.S. Cl.
CPC ............. *G09G 3/32* (2013.01); *G09G 3/2007* (2013.01); *G09G 2300/0819* (2013.01);
(Continued)

(58) Field of Classification Search
CPC ... G09G 3/32–3291; G09G 2300/0819; G09G 2300/0842; G09G 2300/0861; G09G 2300/0871; G09G 2310/0205; G09G 2310/0216; G09G 2310/0243; G09G 2310/027–0275; G09G 2310/0289;
(Continued)

(56) References Cited

U.S. PATENT DOCUMENTS 9,721,530 B2 8/2017 Han et al.
2011/0057959 A1* 3/2011 Park .................... G09G 3/3648 345/690

(Continued)

FOREIGN PATENT DOCUMENTS

KR 1020200081973 A 7/2020
KR 1020230075010 A 5/2023

*Primary Examiner* — Nathan Danielsen
(74) *Attorney, Agent, or Firm* — CANTOR COLBURN LLP

(57) ABSTRACT

A display device include: a display panel including first to third pixels, a data driver for providing first to third data voltages to the first to third pixels, and a scan driver for providing first and second scan signals to each of the first to third pixels. The scan driver performs a first active scan operation of sequentially providing the first and second scan signals to the first to third pixels in a first frame period, and perform a dummy scan operation of sequentially providing the second scan signal to the first to third pixels after the first active scan operation. The data driver changes a voltage level of at least one of the first to third data voltages in an overlap period in which the dummy scan operation and a second active scan operation of a second frame period are simultaneously performed.

20 Claims, 17 Drawing Sheets

(52) U.S. Cl.
CPC ............... *G09G 2300/0842* (2013.01); *G09G 2320/0233* (2013.01); *G09G 2320/0242* (2013.01); *G09G 2340/0435* (2013.01); *G09G 2360/16* (2013.01)

(58) Field of Classification Search
CPC ........... G09G 2310/06; G09G 2310/08; G09G 2320/0233; G09G 2320/0242–0252; G09G 2320/029; G09G 2320/0295; G09G 2340/0435; G09G 2360/16
See application file for complete search history.

(56) References Cited

U.S. PATENT DOCUMENTS

2020/0035165 A1* 1/2020 Park ..................... G09G 3/3233
2022/0366836 A1* 11/2022 Lee .......................... G09G 3/32
2023/0360589 A1* 11/2023 An ....................... G09G 3/2096

* cited by examiner

IDAT:PDAT1,PDAT2,PDAT3

FIG. 12

171a

| IGRAY | COMPV1 |
|---|---|
| 0 | V1[0] |
| 1 | V1[1] |
| 2 | V1[2] |
| 3 | V1[3] |
| ⋮ | ⋮ |
| 255 | V1[255] |

FIG. 14

171b

| IGRAY | COMPV1 |
|---|---|
| 0 | V1[0] |
| 1 | V1[1] |
| 2 | V1[2] |
| 3 | V1[3] |
| ⋮ | ⋮ |
| 255 | V1[255] |

172b

| IGRAY | COMPV2 |
|---|---|
| 0 | V2[0] |
| 1 | V2[1] |
| 2 | V2[2] |
| 3 | V2[3] |
| ⋮ | ⋮ |
| 255 | V2[255] |

FIG. 16

171-1c

| IGRAY | COMPV1-1 |
|---|---|
| 0 | V1-1[0] |
| 1 | V1-1[1] |
| 2 | V1-1[2] |
| 3 | V1-1[3] |
| ⋮ | ⋮ |
| 255 | V1-1[255] |

171-2c

| IGRAY | COMPV1-2 |
|---|---|
| 0 | V1-2[0] |
| 1 | V1-2[1] |
| 2 | V1-2[2] |
| 3 | V1-2[3] |
| ⋮ | ⋮ |
| 255 | V1-2[255] |

171-3c

| IGRAY | COMPV1-3 |
|---|---|
| 0 | V1-3[0] |
| 1 | V1-3[1] |
| 2 | V1-3[2] |
| 3 | V1-3[3] |
| ⋮ | ⋮ |
| 255 | V1-3[255] |

DISPLAY DEVICE AND METHOD FOR DRIVING THE SAME

This application claims priority to Korean Patent Application No. 10-2023-0136601 filed on Oct. 13, 2023, and all the benefits accruing therefrom under 35 U.S.C. § 119, the content of which in its entirety is herein incorporated by reference.

BACKGROUND

1. Field

Embodiments relate to a display device. More particularly, embodiments relate to a display device performing a dummy scan operation and a method for driving the display device.

2. Description of the Related Art

In general, a display device is configured to display an image at a frame frequency (or a refresh rate) of about 60 Hz, about 120 Hz, about 240 Hz, or the like. However, a frame frequency of rendering performed by a host processor (e.g., a graphic processing unit ("GPU"), an application processor ("AP"), or a graphic card) configured to provide frame data to the display device may not match the frame frequency of the display device. In particular, when the host processor provides frame data for a game image that requires complex rendering to the display device, such frame frequency mismatch may become severe, and the frame frequency mismatch may cause a tearing phenomenon in which a boundary line appears in the image displayed on the display device or the like.

In order to prevent the tearing phenomenon, a variable frame mode (e.g., a free-sync mode, a G-sync mode, etc.) in which the host processor changes a blank period for each frame period to provide frame data to the display device at a variable frame frequency has been developed. A display device that supports the variable frame mode may prevent the tearing phenomenon by displaying the image in synchronization with the variable frame frequency, that is, by driving the display panel at the variable frame frequency or a variable driving frequency.

SUMMARY

Embodiments provide a display device with a reduced color deviation when driven at a variable frequency.

Embodiments provide a method for a display device with a reduced color deviation when driven at a variable frequency.

A display device according to embodiments includes: a display panel including a first pixel configured to display a first color, a second pixel configured to display a second color, and a third pixel configured to display a third color; a data driver configured to provide a first data voltage, a second data voltage, and a third data voltage to the first pixel, the second pixel, and the third pixel, respectively; a scan driver configured to provide a first scan signal and a second scan signal to each of the first to third pixels; and a controller configured to control the data driver and the scan driver, and receive first pixel data, second pixel data, and third pixel data corresponding to the first data voltage, the second data voltage, and the third data voltage, respectively. Each of the first to third pixels is provided in plurality. The scan driver is configured to perform a first active scan operation of sequentially providing the first scan signal and the second scan signal to the first to third pixels row by row in a first frame period corresponding to a first driving frequency, and perform a dummy scan operation of sequentially providing the second scan signal to the first to third pixels row by row after the first active scan operation. The data driver is configured to change a voltage level of at least one of the first to third data voltages in an overlap period in which the dummy scan operation and a second active scan operation of a second frame period are simultaneously performed when the dummy scan operation is not completed at start of the second frame period corresponding to a second driving frequency different from the first driving frequency.

In an embodiment, the first color, the second color, and the third color may be green, blue, and red, respectively.

In an embodiment, the data driver may be configured to change the voltage level of the first data voltage in the overlap period.

In an embodiment, for the same gray level, the voltage level of the first data voltage in the overlap period may be higher than a voltage level of the first data voltage in a non-overlap period in which only the second active scan operation of the second active scan operation and the dummy scan operation is performed after the dummy scan operation is completed.

In an embodiment, the data driver may be configured to change both the voltage level of the first data voltage and the voltage level of the second data voltage in the overlap period.

In an embodiment, for the same gray level, the voltage level of the first data voltage in the overlap period may be higher than a voltage level of the first data voltage in a non-overlap period in which only the second active scan operation of the second active scan operation and the dummy scan operation is performed after the dummy scan operation is completed. For the same gray level, the voltage level of the second data voltage in the overlap period may be higher than a voltage level of the second data voltage in the non-overlap period.

In an embodiment, the controller may include an overlap area detector configured to calculate an overlap area including overlap pixel rows configured to receive the first and second scan signals in the overlap period among all pixel rows of the display panel based on a frequency difference between the first driving frequency and the second driving frequency, and a data compensator configured to compensate for at least one of the first to third pixel data for the overlap area.

In an embodiment, the first color, the second color, and the third color may be green, blue, and red, respectively.

In an embodiment, the display device may further include a compensation lookup table configured to store a plurality of compensation values corresponding to a plurality of input gray levels. The data compensator may be configured to obtain a compensation value, of the plurality of compensation values, corresponding to an input gray level, of the plurality of input gray levels, indicated by the first pixel data for the overlap area by using the compensation lookup table, and compensate for the first pixel data for the overlap area by adding the compensation value to the input gray level.

In an embodiment, the display device may further include: a first compensation lookup table configured to store a plurality of first compensation values corresponding to a plurality of input gray levels, and a second compensation lookup table configured to store a plurality of second compensation values corresponding to the input gray levels and different from the first compensation values. The data compensator may be configured to compensate for the first pixel data for the overlap area by using the first compensation lookup table, and compensate for the second pixel data for the overlap area by using the second compensation lookup table.

In an embodiment, the display device may further include a first range compensation lookup table configured to store a plurality of first range compensation values corresponding to a plurality of input gray levels, and a second range compensation lookup table configured to store a plurality of second range compensation values corresponding to the input gray levels and different from the first range compensation values. The data compensator may be configured to compensate for the first pixel data for the overlap area by using the first range compensation lookup table when the frequency difference is within a first frequency range, and compensate for the first pixel data for the overlap area by using the second range compensation lookup table when the frequency difference is within a second frequency range different from the first frequency range.

In an embodiment, the second driving frequency may be a non-integer multiple of the first driving frequency when the second driving frequency is greater than the first driving frequency.

In an embodiment, each of the first to third pixels may include a capacitor including a first electrode connected to a first node, and a second electrode connected to a second node, a first transistor including a gate connected to the first node, a drain configured to receive a first power voltage, and a source connected to the second node, a second transistor configured to transmit one of the first to third data voltages to the first node in response to the first scan signal, a third transistor configured to transmit an initialization voltage to the second node in response to the second scan signal, and a light emitting element including an anode connected to the second node, and a cathode configured to receive a second power voltage.

A method for driving a display device according to embodiments includes: performing a first active scan operation of sequentially providing a first scan signal and a second scan signal to a first pixel configured to display a first color, a second pixel configured to display a second color, and a third pixel configured to display a third color row by row in a first frame period corresponding to a first driving frequency, performing a dummy scan operation of sequentially providing the second scan signal to the first to third pixels row by row after the first active scan operation, and changing a voltage level of at least one of a first data voltage, a second data voltage, or a third data voltage provided to the first pixel, the second pixel, and the third pixel, respectively, in an overlap period in which the dummy scan operation and a second active scan operation of a second frame period are simultaneously performed when the dummy scan operation is not completed at start of the second frame period corresponding to a second driving frequency different from the first driving frequency.

In an embodiment, the first color, the second color, and the third color may be green, blue, and red, respectively.

In an embodiment, the voltage level of the first data voltage may be changed in the overlap period.

In an embodiment, for the same gray level, the voltage level of the first data voltage in the overlap period may be higher than a voltage level of the first data voltage in a non-overlap period in which only the second active scan operation of the second active scan operation and the dummy scan operation is performed after the dummy scan operation is completed.

In an embodiment, both the voltage level of the first data voltage and the voltage level of the second data voltage may be changed in the overlap period.

In an embodiment, for the same gray level, the voltage level of the first data voltage in the overlap period may be higher than a voltage level of the first data voltage in a non-overlap period in which only the second active scan operation of the second active scan operation and the dummy scan operation is performed after the dummy scan operation is completed. For the same gray level, the voltage level of the second data voltage in the overlap period may be higher than a voltage level of the second data voltage in the non-overlap period.

In an embodiment, the second driving frequency may be a non-integer multiple of the first driving frequency when the second driving frequency is greater than the first driving frequency.

In the display device and the method for driving the display device according to the embodiments, a voltage level of at least one of first to third data voltages may be changed in an overlap period in which a dummy scan operation of a first frame period and a second active scan operation of a second frame period are simultaneously performed. Accordingly, a color deviation between an upper area of a display panel in which pixel rows that receive the first to third data voltages in the overlap period are located and a lower area of the display panel in which pixel rows that receive the first to third data voltages in a non-overlap period in which only the second active scan operation of the second active scan operation and the dummy scan operation is performed after the dummy scan operation is completed are located may be effectively reduced.

BRIEF DESCRIPTION OF THE DRAWINGS

Illustrative, non-limiting embodiments will be more clearly understood from the following detailed description taken in conjunction with the accompanying drawings.

FIG. 12 is a view showing an example of a compensation lookup table included in the memory of FIG. 11.

FIG. 14 is a view showing an example of first and second compensation lookup tables included in the memory of FIG. 13.

FIG. 16 is a view showing an example of a plurality of range compensation lookup tables included in the memory of FIG. 15.

DETAILED DESCRIPTION

Figure 1:
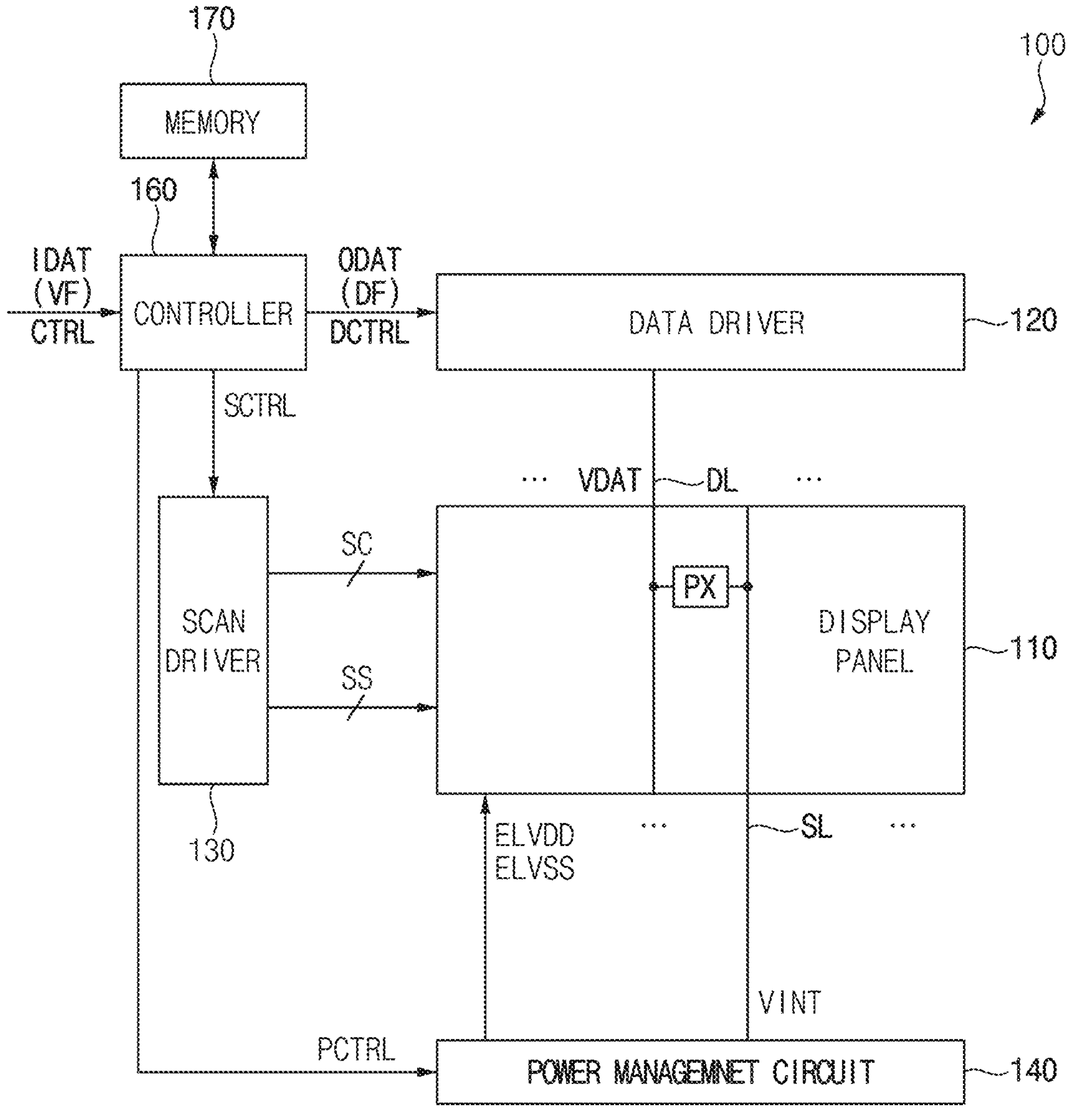
FIG. 1 is a block diagram showing a display device according to an embodiment.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. Hereinafter, a display device and a method for driving a display device according to embodiments of the present disclosure will be described in more detail with reference to the accompanying drawings. The same or similar reference numerals will be used for the same elements in the accompanying drawings.

Figure 2:
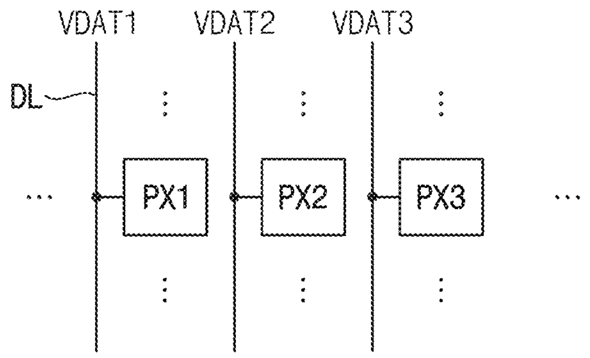
FIG. 2 is a view showing an example of first to third pixels included in the display device of FIG. 1.
Figure 3:
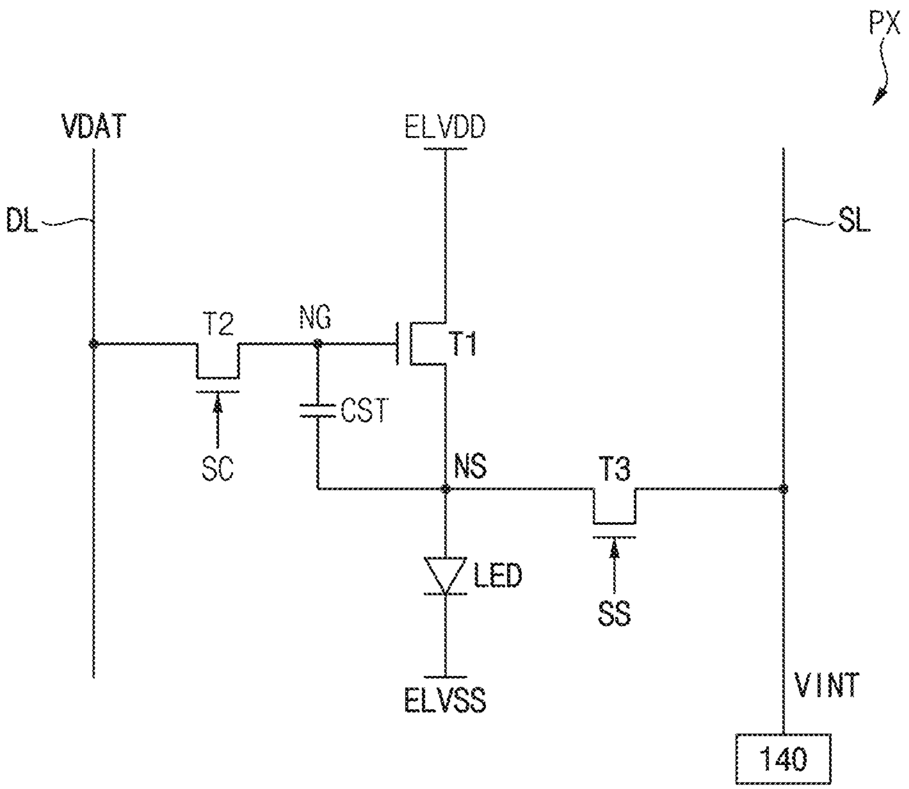
FIG. 3 is a circuit diagram showing an example of a pixel included in the display device of FIG. 1.
Figure 4:
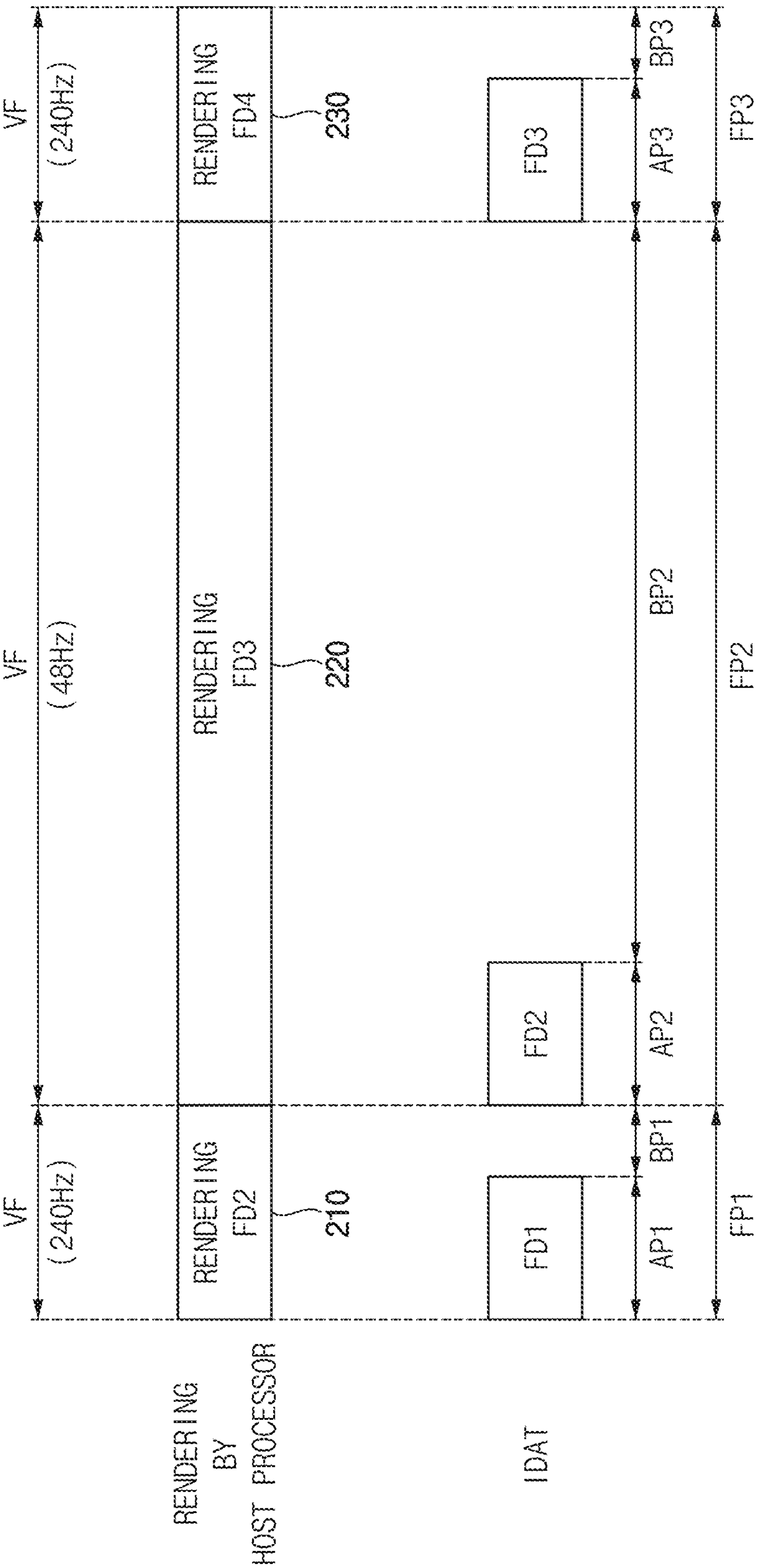
FIG. 4 is a timing diagram showing an example of input image data that is input to the display device of FIG. 1 at a variable frequency.
Figure 5:
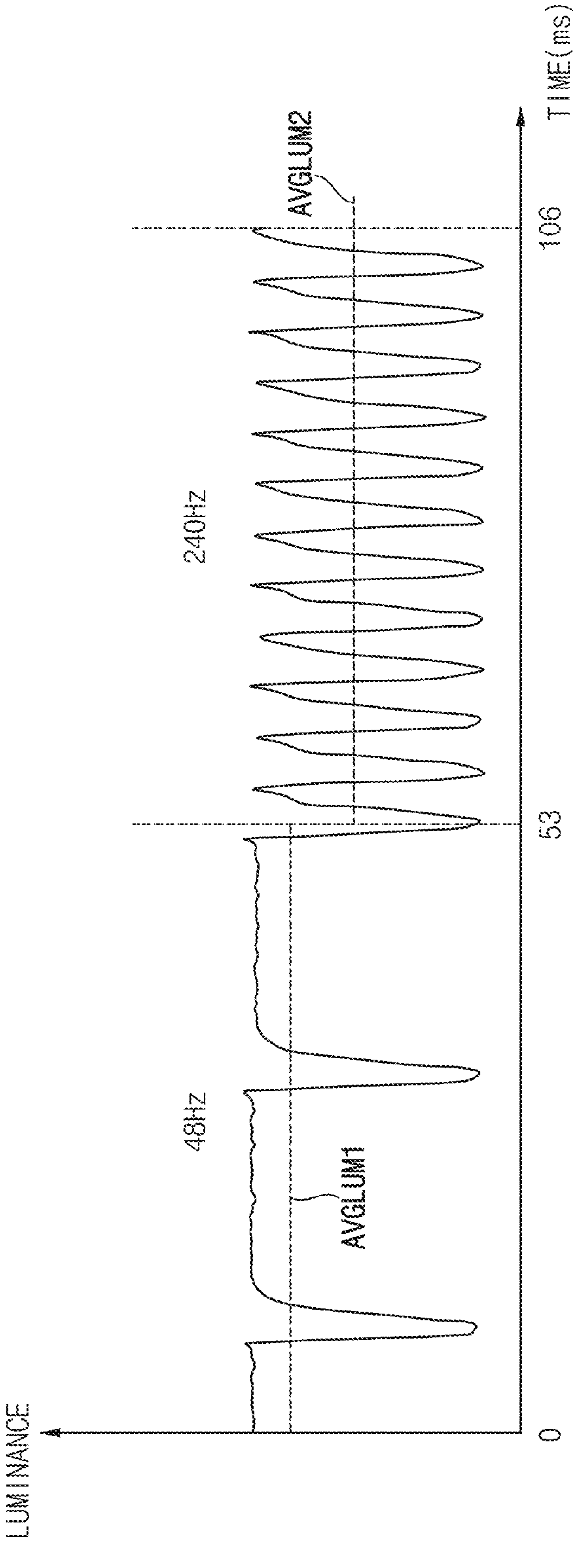
FIG. 5 is a view showing an example of luminances of a display panel driven at mutually different driving frequencies in a display device according to a comparative example.
Figure 6:
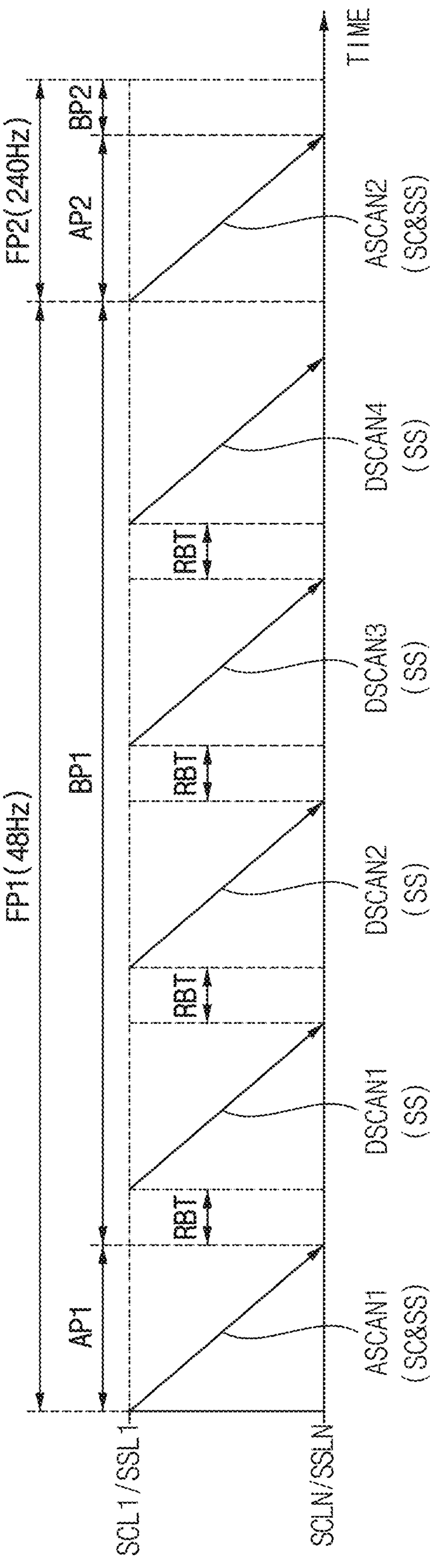
FIG. 6 is a view showing an example of an active scan operation and a dummy scan operation performed in the display device of FIG. 1.
Figure 7:
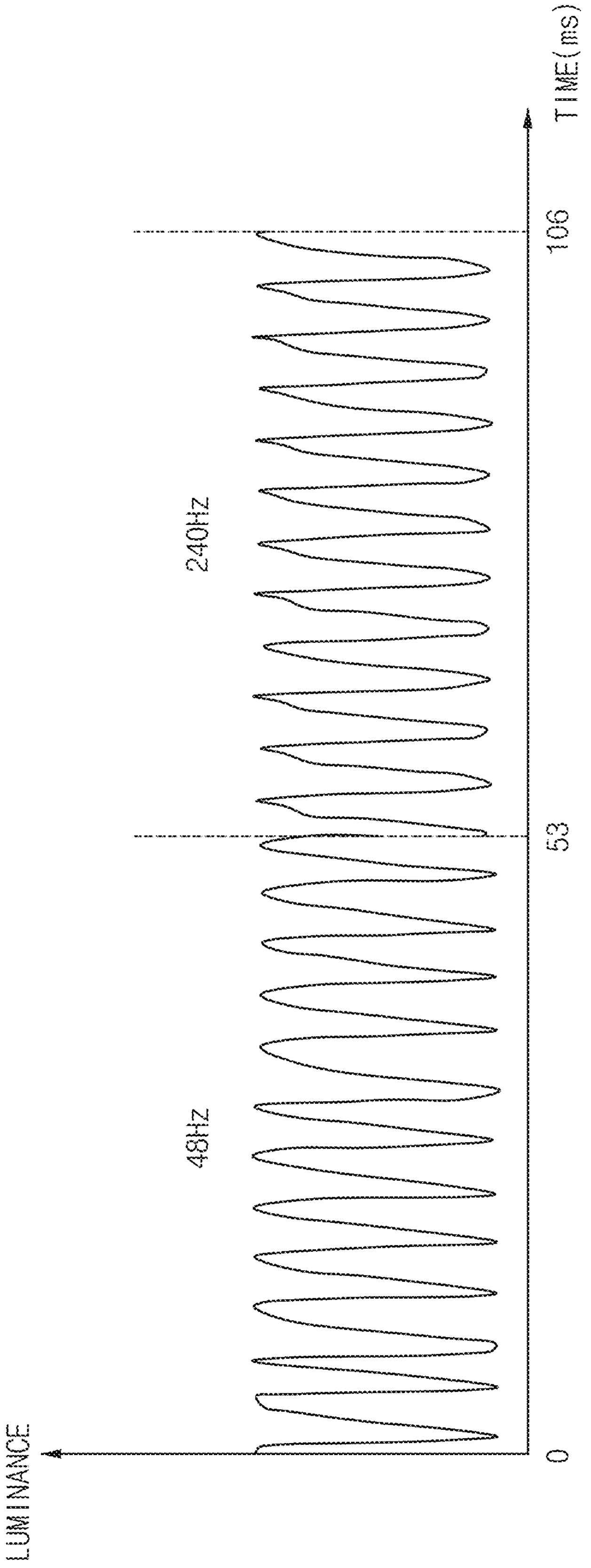
FIG. 7 is a view showing an example of luminances of a display panel driven at mutually different driving frequencies in a display device according to an embodiment.
Figure 8:
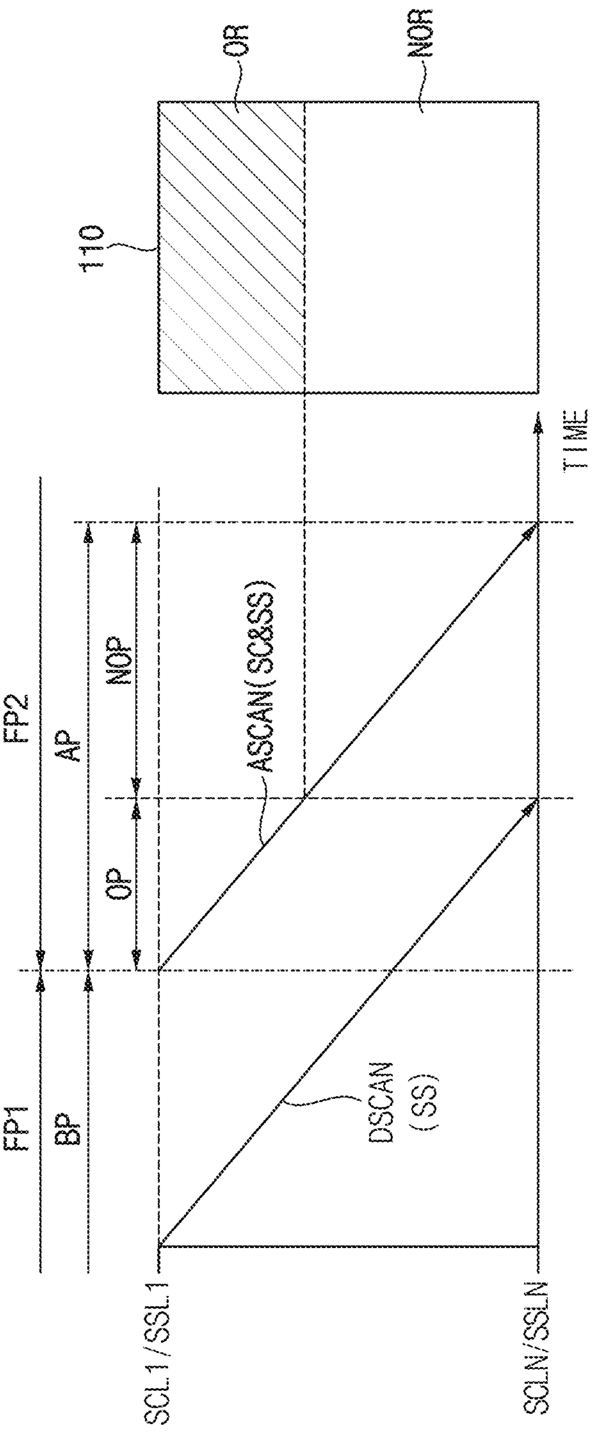
FIG. 8 is a view for describing an example of a color deviation between an upper area and a lower area of a display panel in the display device according to the comparative example.
Figure 9:
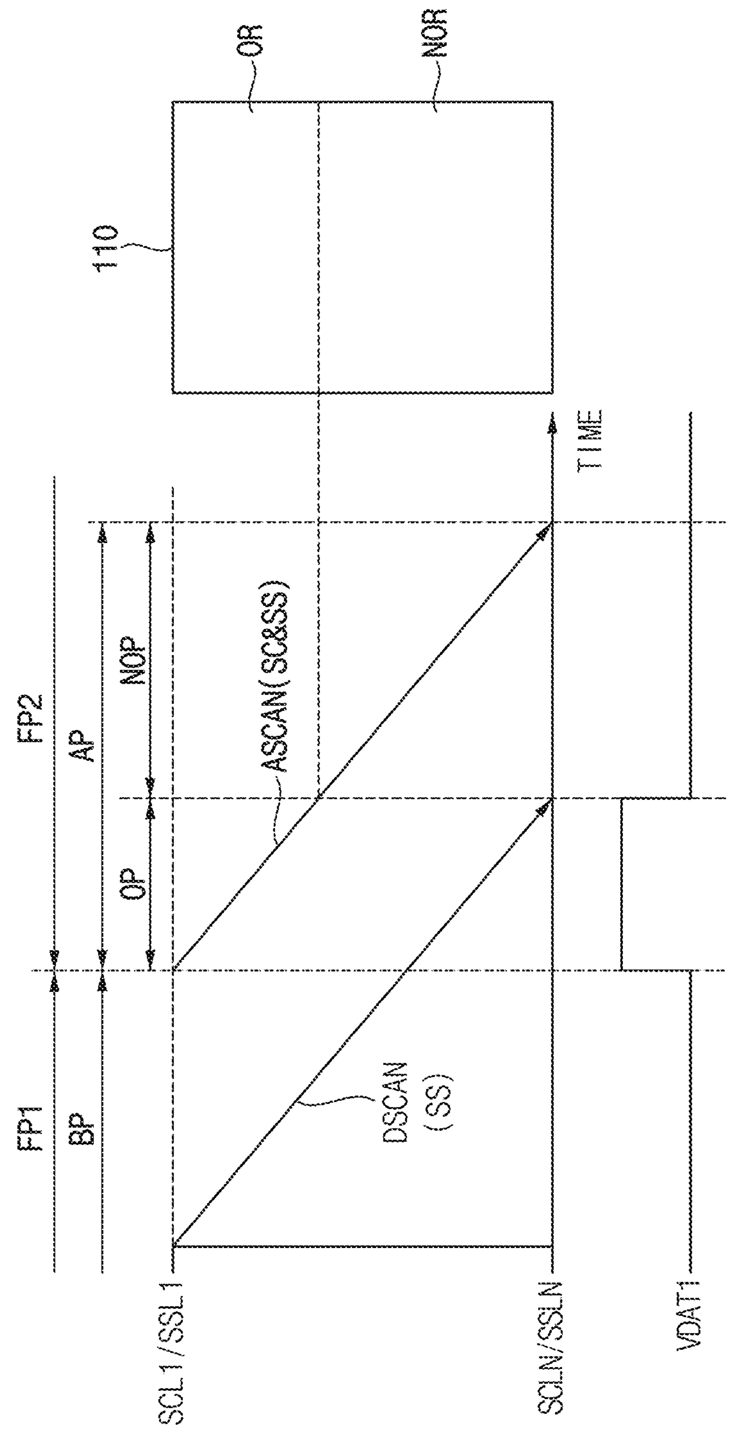
FIG. 9 is a view for describing a change in a voltage level of a first data voltage in an overlap period according to an embodiment.
Figure 10:
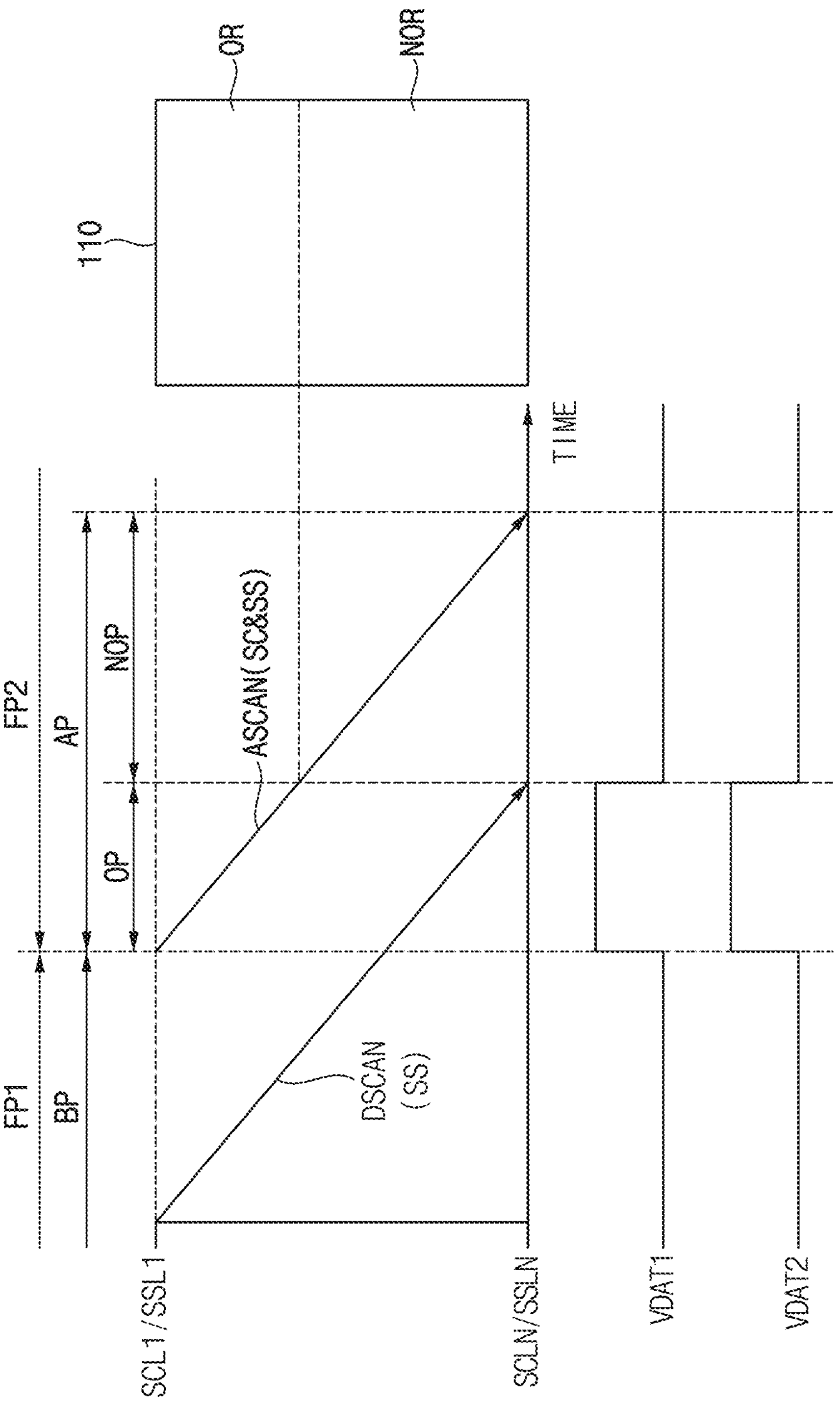
FIG. 10 is a view for describing a change in a voltage level of a first data voltage and a voltage level of a second data voltage in an overlap period according to an embodiment.

FIG. 1 is a block diagram showing a display device according to an embodiment. FIG. 2 is a view showing an example of first to third pixels included in the display device of FIG. 1. FIG. 3 is a circuit diagram showing an example of a pixel included in the display device of FIG. 1. FIG. 4 is a timing diagram showing an example of input image data that is input to the display device of FIG. 1 at a variable frequency. FIG. 5 is a view showing an example of luminances of a display panel driven at mutually different driving frequencies in a display device according to a comparative example. FIG. 6 is a view showing an example of an active scan operation and a dummy scan operation performed in the display device of FIG. 1. FIG. 7 is a view showing an example of luminances of a display panel driven at mutually different driving frequencies in a display device according to an embodiment. FIG. 8 is a view for describing an example of a color deviation between an upper area and a lower area of a display panel in the display device according to the comparative example. FIG. 9 is a view for describing a change in a voltage level of a first data voltage in an overlap period according to an embodiment. FIG. 10 is a view for describing a change in a voltage level of a first data voltage and a voltage level of a second data voltage in an overlap period according to an embodiment.

Referring to FIG. 1, a display device 100 may include: a display panel 110 including a plurality of pixels PX; a data driver 120 configured to provide a data voltage VDAT to each of the pixels PX; a scan driver 130 configured to provide a first scan signal SC and a second scan signal SS to each of the pixels PX; a power management circuit 140 configured to generate voltages ELVDD, ELVSS, and VINT; and a controller 160 configured to control an operation of the display device 100. According to an embodiment, the display device 100 may further include a memory 170.

The display panel 110 may further include a plurality of data lines DL, a plurality of first scan lines, a plurality of second scan lines, and a plurality of initialization lines SL, which are connected to the pixels PX. According to an embodiment, each of the pixels PX may include a light emitting element, and the display panel 110 may be a light emitting display panel.

In an embodiment, for example, as shown in FIG. 2, the pixels PX may include a first pixel PX1 configured to display a first color, a second pixel PX2 configured to display a second color, and a third pixel PX3 configured to display a third color. A first data voltage VDAT1, a second data voltage VDAT2, and a third data voltage VDAT3 may be provided to the first pixel PX1, the second pixel PX2, and the third pixel PX3, respectively. According to an embodiment, the first color, the second color, and the third color may be green, blue, and red, respectively. In other words, the first pixel PX1, the second pixel PX2, and the third pixel PX3 may be a green pixel, a blue pixel, and a red pixel, respectively.

In an embodiment, for example, as shown in FIG. 3, each of the pixels PX may include a first transistor T1, a second transistor T2, a third transistor T3, a capacitor CST, and a light emitting element LED.

The capacitor CST may store the data voltage VDAT transmitted from the data line DL by the second transistor T2. The capacitor CST may be referred to as a storage capacitor configured to store the data voltage VDAT, but is not limited thereto. According to another embodiment, the capacitor CST may include a first electrode connected to a first node NG, and a second electrode connected to a second node NS.

The first transistor T1 may generate a driving current based on the data voltage VDAT stored in the capacitor CST. The first transistor T1 may be referred to as a driving transistor configured to generate the driving current, but is not limited thereto. According to another embodiment, the first transistor T1 may include a gate connected to the first node NG, a drain configured to receive a first power voltage ELVDD, and a source connected to the second node NS.

The second transistor T2 may transmit the data voltage VDAT to the first node NG in response to the first scan signal SC. The second transistor T2 may be referred to as a scan transistor, but is not limited thereto. According to another embodiment, the second transistor T2 may include a gate configured to receive the first scan signal SC, a drain connected to the data line DL, and a source connected to the first node NG.

The third transistor T3 may connect the initialization line SL to the second node NS in response to the second scan signal SS. The power management circuit 140 may apply an initialization voltage VINT to the initialization line SL, and the third transistor T3 may transmit the initialization voltage VINT of the initialization line SL to the second node NS in response to the second scan signal SS. According to an embodiment, the third transistor T3 may include a gate configured to receive the second scan signal SS, a drain connected to the second node NS, and a source connected to the initialization line SL.

The light emitting element LED may emit a light in response to the driving current flowing from a line configured to transmit the first power voltage ELVDD to a line configured to transmit a second power voltage ELVSS. According to an embodiment, the light emitting element LED may include an anode connected to the second node NS, and a cathode configured to receive the second power voltage ELVSS. According to an embodiment, the light emitting element LED may be an organic light emitting diode ("OLED"). According to an embodiment, the light emitting element LED may be a nano-light emitting diode ("NED"), a quantum dot ("QD") light emitting diode, a micro-light emitting diode, an inorganic light emitting diode, or the like.

According to an embodiment, as shown in FIG. 3, the first to third transistors T1, T2, and T3 may be implemented as N-type metal oxide semiconductor ("NMOS") transistors, but are not limited thereto. In addition, according to another embodiment, as shown in FIG. 3, the pixel PX may include three transistors T1, T2, and T3 and one capacitor CST, but is not limited thereto. In addition, a connection structure between components of the pixel PX is not limited to the connection structure shown in FIG. 3.

The data driver 120 may generate data voltages VDAT based on a data control signal DCTRL and output image data ODAT received from the controller 160, and provide the data voltages VDAT to the pixels PX through the data lines DL. According to an embodiment, the data control signal DCTRL may include an output data enable signal, a horizontal start signal, a load signal, and/or the like, but is not limited thereto. In addition, according to another embodiment, the data driver 120 may receive the output image data ODAT from the controller 160 at a driving frequency DF that varies within a variable frequency range (e.g., from about 48 Hz to about 240 Hz).

The scan driver 130 may generate the first and second scan signals SC and SS based on a scan control signal SCTRL received from the controller 160, and sequentially provide the first and second scan signals SC and SS to the pixels PX row by row through the first and second scan lines. According to an embodiment, the scan control signal SCTRL may include a first scan start signal and a first scan clock signal for generating first scan signals SC, and a second scan start signal and a second scan clock signal for generating second scan signals SS, but is not limited thereto.

The power management circuit 140 may generate the voltages ELVDD, ELVSS, and VINT for the operation of the display device 100. According to an embodiment, the power management circuit 140 may generate the first power voltage ELVDD (e.g., a high power voltage), the second power voltage ELVSS (e.g., a low power voltage), and the initialization voltage VINT, which are provided to the display panel 110. The power management circuit 140 may provide the initialization voltage VINT to the pixels PX through the initialization lines SL.

The controller 160 (e.g., a timing controller ("TCON")) may receive input image data IDAT and a control signal CTRL from an external host processor (e.g., a graphic processing unit ("GPU"), an application processor ("AP"), or a graphic card). The input image data IDAT may include first pixel data PDAT1, second pixel data PDAT2, and third pixel data PDAT3. The first pixel data PDAT1, the second pixel data PDAT2, and the third pixel data PDAT3 may correspond to the first data voltage VDAT1, the second data voltage VDAT2, and the third data voltage VDAT3, respectively. According to an embodiment, the control signal CTRL may include a vertical synchronization signal, a horizontal synchronization signal, a master clock signal, and/or the like, but is not limited thereto. The controller 160 may generate the output image data ODAT, the data control signal DCTRL, the scan control signal SCTRL, and a power management signal PCTRL based on the input image data IDAT and the control signal CTRL. The controller 160 may control an operation of the data driver 120 by providing the output image data ODAT and the data control signal DCTRL to the data driver 120, control an operation of the scan driver 130 by providing the scan control signal SCTRL to the scan driver 130, and control an operation of the power management circuit 140 by providing the power management signal PCTRL to the power management circuit 140.

The host processor may change a time length of a blank period for each frame period to provide the input image data IDAT to the display device 100 at a variable frequency VF (or a variable frame rate), and the controller 160 may receive the input image data IDAT from the host processor at the variable frequency VF that varies within the variable frequency range. According to an embodiment, a maximum frequency of the variable frequency range may be about 240 Hz, and a minimum frequency of the variable frequency range may be about 48 Hz, but the frequencies are not limited thereto. In addition, the driving frequency DF of the display panel 110 may be determined as the variable frequency VF that varies within the variable frequency range. In other words, the controller 160 may control the data driver 120 and the scan driver 130 to drive the display panel 110 at the same driving frequency DF as the variable frequency VF. According to an embodiment, a mode of the display device 100 in which the display panel 110 is driven at the variable frequency VF (or the variable frame rate) may be referred to as a variable frame mode. Meanwhile, the variable frame mode may be a free-sync mode, a G-sync mode, or the like, but is not limited thereto.

In an embodiment, for example, as shown in FIG. 4, a period or a frequency of rendering 210, 220, and 230 of the host processor may not be constant, and the host processor may provide the input image data IDAT, that is, frame data FD1, FD2, and FD3, to the display device 100 in synchronization with such an inconstant period or frequency of the rendering 210, 220, and 230 in the variable frame mode. In other words, in the variable frame mode, while frame periods FP1, FP2, and FP3 may have active periods AP1, AP2, and AP3 having a constant time length, respectively, the host processor may change time lengths of blank periods BP1, BP2, and BP3 of the frame periods FP1, FP2, and FP3 to provide the frame data FD1, FD2, and FD3 to the display device 100 at the variable frequency VF.

According to an example shown in FIG. 4, in a first frame period FP1, when the rendering 210 for second frame data FD2 is performed at a frequency of about 240 Hz, the host processor may provide first frame data FD1 to the display device 100 at the variable frequency VF of about 240 Hz. In addition, the host processor may output the second frame data FD2 during a second active period AP2 of a second frame period FP2, and continue a second blank period BP2 of the second frame period FP2 until the rendering 220 for third frame data FD3 is completed. Therefore, in the second frame period FP2, when the rendering 220 for the third frame data FD3 is performed at a frequency of about 48 Hz, the host processor may increase a time length of the second blank period BP2 of the second frame period FP2 to provide the second frame data FD2 to the display device 100 at the variable frequency VF of about 48 Hz. In a third frame period FP3, when the rendering 230 for fourth frame data FD4 is performed at the frequency of about 240 Hz again, the host processor may provide the third frame data FD3 to the display device 100 at a frame frequency of about 240 Hz again.

However, a conventional display device configured to operate in a variable frame mode may have mutually different luminances at mutually different driving frequencies DF. In other words, according to the conventional display device, each of pixels PX may receive a second scan signal SS only once in each of frame periods FP1, FP2, and FP3, a second node NS of each of the pixels PX may be initialized only once based on an initialization voltage VINT in each of the frame periods FP1, FP2, and FP3, and a light emitting element LED of each of the pixels PX may be turned off only once in each of the frame periods FP1, FP2, and FP3. In addition, when the driving frequency DF varies (i.e., when time lengths of the frame periods FP1, FP2, and FP3 are changed), the number of times the second scan signal SS is applied to each of the pixels PX (i.e., the number of times the light emitting element LED of each of the pixels PX is turned off) for a predetermined time may be changed. Accordingly, even when the conventional display device displays an image having the same gray level, when the driving frequency DF of a display panel 110 is changed, the luminance of the display panel 110 may be changed. For example, as shown in FIG. 5, according to the conventional display device, for the same time (e.g., about 53 milliseconds (ms)), each of light emitting elements LED of the display panel 110 driven at the driving frequency DF of about 48 Hz may be turned off about 2.5 times, and each of the light emitting elements LED of the display panel 110 driven at the driving frequency DF of about 240 Hz may be turned off about 12.5 times. Accordingly, an average luminance AVGLUM2 of the display panel 110 driven at the driving frequency DF of about 240 Hz may be lower than an average luminance AVGLUM1 of the display panel 110 driven at the driving frequency DF of about 48 Hz.

However, in order to reduce such a luminance deviation of the display panel 110 driven at mutually different driving frequencies DF, according to the display device 100 of embodiments, the scan driver 130 may perform an active scan operation of sequentially providing the first scan signal SC and the second scan signal SS to the pixels PX row by row in the active period of each of the frame periods, and may perform a dummy scan operation of sequentially providing the second scan signal SS to the pixels PX row by row in the blank period of each of the frame periods. According to an embodiment, the scan driver 130 may start the dummy scan operation when a reference blank time passes after the blank period starts. According to an embodiment, the reference blank time may be substantially equal to a time length of a blank period of a minimum frame period (about 4.2 ms) corresponding to a maximum frequency (e.g., about 240 Hz) of the variable frequency range. According to an embodiment, when the blank period continues for the reference blank time after the dummy scan operation is completed, the scan driver 130 may repeatedly perform the dummy scan operation.

In an embodiment, for example, as shown in FIG. 6, in a first active period AP1 of the first frame period FP1 corresponding to a frequency of about 48 Hz, the scan driver 130 may perform a first active scan operation ASCAN1 of sequentially outputting the first and second scan signals SC and SS from first and second scan lines SCL1 and SSL1 for a first pixel row of the display panel 110 to first and second scan lines SCLN and SSLN for an $N^{th}$ pixel row (where N is an integer that is greater than or equal to 2) of the display panel 110. When the reference blank time RBT (e.g., the time length of the blank period of the minimum frame period corresponding to the maximum frequency) passes after a first blank period BP1 of the first frame period FP1 starts, the scan driver 130 may perform a first dummy scan operation DSCAN1 of sequentially outputting the second scan signal SS from the second scan line SSL1 for the first pixel row to the second scan line SSLN for the $N^{th}$ pixel row. Meanwhile, while the first dummy scan operation DSCAN1 is performed, since the first scan signal SC is not applied to each of the pixels PX, the data voltage VDAT stored in each of the pixels PX may be maintained, the second node NS of each of the pixels PX may be initialized, and the light emitting element LED of each of the pixels PX may be turned off. In addition, a second dummy scan operation DSCAN2 may be performed after another reference blank time RBT passes from a time at which the first dummy scan operation DSCAN1 is completed, a third dummy scan operation DSCAN3 may be performed after still another reference blank time RBT passes from a time at which the second dummy scan operation DSCAN2 is completed, and a fourth dummy scan operation DSCAN4 may be performed after yet another reference blank time RBT passes from a time at which the third dummy scan operation DSCAN3 is completed. In addition, a second active scan operation ASCAN2 may be performed in the second active period AP2 of the second frame period FP2 corresponding to a frequency of about 240 Hz, and a dummy scan operation may not be performed in the second blank period BP2 of the second frame period FP2.

As described above, according to the display device 100 of the embodiments, the dummy scan operations DSCAN1, DSCAN2, DSCAN3, and DSCAN4 may be performed during the first blank period BP1, so that a luminance may be substantially the same at mutually different driving frequencies DF. In an embodiment, for example, as shown in FIG. 7, according to the display device 100 of the embodiments, for the same time (e.g., about 53 ms), each of light emitting elements LED of the display panel 110 driven at the driving frequency DF of about 48 Hz and each of light emitting elements LED of the display panel 110 driven at the driving frequency DF of about 240 Hz may be turned off the same number of times, for example, about 12.5 times. Accordingly, according to the display device 100 of the embodiments, a luminance of the display panel 110 driven at the driving frequency DF of about 48 Hz may be substantially the same as a luminance of the display panel 110 driven at the driving frequency DF of about 240 Hz.

However, when a second driving frequency corresponding to a second frame period is greater than a first driving frequency corresponding to a first frame period, and the second driving frequency is a non-integer multiple of the first driving frequency, a color deviation may occur between an upper area and a lower area of the display panel 110. When the second driving frequency (e.g., about 240 Hz) is a non-integer multiple of the first driving frequency (e.g., about 49 Hz to about 59 Hz, about 61 Hz to about 79 Hz, about 81 Hz to about 119 Hz, or about 121 Hz to about 239 Hz), the second frame period may start before a dummy scan operation started in a blank period of the first frame period is completed, and a color deviation may occur between the upper area and the lower area of the display panel 110. For example, as shown in FIG. 8, while the second nodes NS of the pixels PX located in one row may be initialized (or discharged) in a non-overlap period NOP in which only an active scan operation ASCAN of the active scan operation ASCAN and the dummy scan operation DSCAN is performed after a dummy scan operation DSCAN is completed, the second scan signals SS may be substantially simultaneously applied to the pixels PX located in two rows in an overlap period OP in which the dummy scan operation DSCAN started in a blank period BP of a first frame period FP1 and the active scan operation ASCAN in an active period AP of a second frame period FP2 are simultaneously performed, and the second nodes NS of the pixels PX located in the two rows may be substantially simultaneously initialized (or discharged). Therefore, a sink current flowing through the initialization line SL in the overlap period OP may be greater than a sink current flowing through the initialization line SL in the non-overlap period NOP, and a voltage drop through the initialization line SL in the overlap period OP may be greater than a voltage drop through the initialization line SL in the non-overlap period NOP. Accordingly, a luminance of an overlap area OR (e.g., the upper area of the display panel 110) that receives the data voltage VDAT in the overlap period OP may be lower than a luminance of a non-overlap area NOR (e.g., the lower area of the display panel 110) that receives the data voltage VDAT in the non-overlap period NOP, and a luminance deviation may occur between the overlap area OR and the non-overlap area NOR of the display panel 110. The overlap area OR may include "overlap pixel rows" that receive the first and second scan signals SC and SS in the overlap period OP among all pixel rows of the display panel 110. In addition, since characteristics of the light emitting elements LED (e.g., capacitances and/or driving currents of the light emitting elements LED) included in the first to third pixels PX1, PX2, and PX3 configured to display mutually different colors are different from each other, a luminance deviation between the first pixel PX1 in the overlap area OR and the first pixel PX1 in the non-overlap area NOR, a luminance deviation between the second pixel PX2 in the overlap area OR and the second pixel PX2 in the non-overlap area NOR, and a luminance deviation between the third pixel PX3 in the overlap area OR and the third pixel PX3 in the non-overlap area NOR may be different from each other, and a color deviation may occur between the overlap area OR and the non-overlap area NOR of the display panel 110. For example, the luminance deviation between the first pixel PX1 in the overlap area OR and the first pixel PX1 in the non-overlap area NOR may be greater than each of the luminance deviation between the second pixel PX2 in the overlap area OR and the second pixel PX2 in the non-overlap area NOR and the luminance deviation between the third pixel PX3 in the overlap area OR and the third pixel PX3 in the non-overlap area NOR, and the luminance deviation between the second pixel PX2 in the overlap area OR and the second pixel PX2 in the non-overlap area NOR may be greater than the luminance deviation between the third pixel PX3 in the overlap area OR and the third pixel PX3 in the non-overlap area NOR, so that the overlap area OR of the display panel 110 may display a purplish image when the non-overlap area NOR of the display panel 110 displays a white image.

In order to reduce the color deviation between the upper area OR and the lower area NOR of the display panel 110, the display device 100 according to the embodiments may change a voltage level of at least one of the first to third data voltages VDAT1, VDAT2, and VDAT3 in the overlap period OP.

According to an embodiment, as shown in FIG. 9, the display device 100 may change the voltage level of the first data voltage VDAT1 in the overlap period OP. For the same gray level, the voltage level of the first data voltage VDAT1 in the overlap period OP may be higher than a voltage level of the first data voltage VDAT1 in the non-overlap period NOP. Accordingly, the luminance deviation between the first pixel PX1 in the overlap area OR and the first pixel PX1 in the non-overlap area NOR may be effectively reduced, and the color deviation between the overlap area OR and the non-overlap area NOR of the display panel 110 may be effectively reduced.

According to an embodiment, as shown in FIG. 10, the display device 100 may change the voltage level of the first data voltage VDAT1 and the voltage level of the second data voltage VDAT2 in the overlap period OP. For the same gray level, the voltage level of the first data voltage VDAT1 in the overlap period OP may be higher than a voltage level of the first data voltage VDAT1 in the non-overlap period NOP, and, for the same gray level, the voltage level of the second data voltage VDAT2 in the overlap period OP may be higher than a voltage level of the second data voltage VDAT2 in the non-overlap period NOP. Accordingly, the luminance deviation between the first pixel PX1 in the overlap area OR and the first pixel PX1 in the non-overlap area NOR and the luminance deviation between the second pixel PX2 in the overlap area OR and the second pixel PX2 in the non-overlap area NOR may be effectively reduced, and the color deviation between the overlap area OR and the non-overlap area NOR of the display panel 110 may be effectively reduced.

Figure 11:
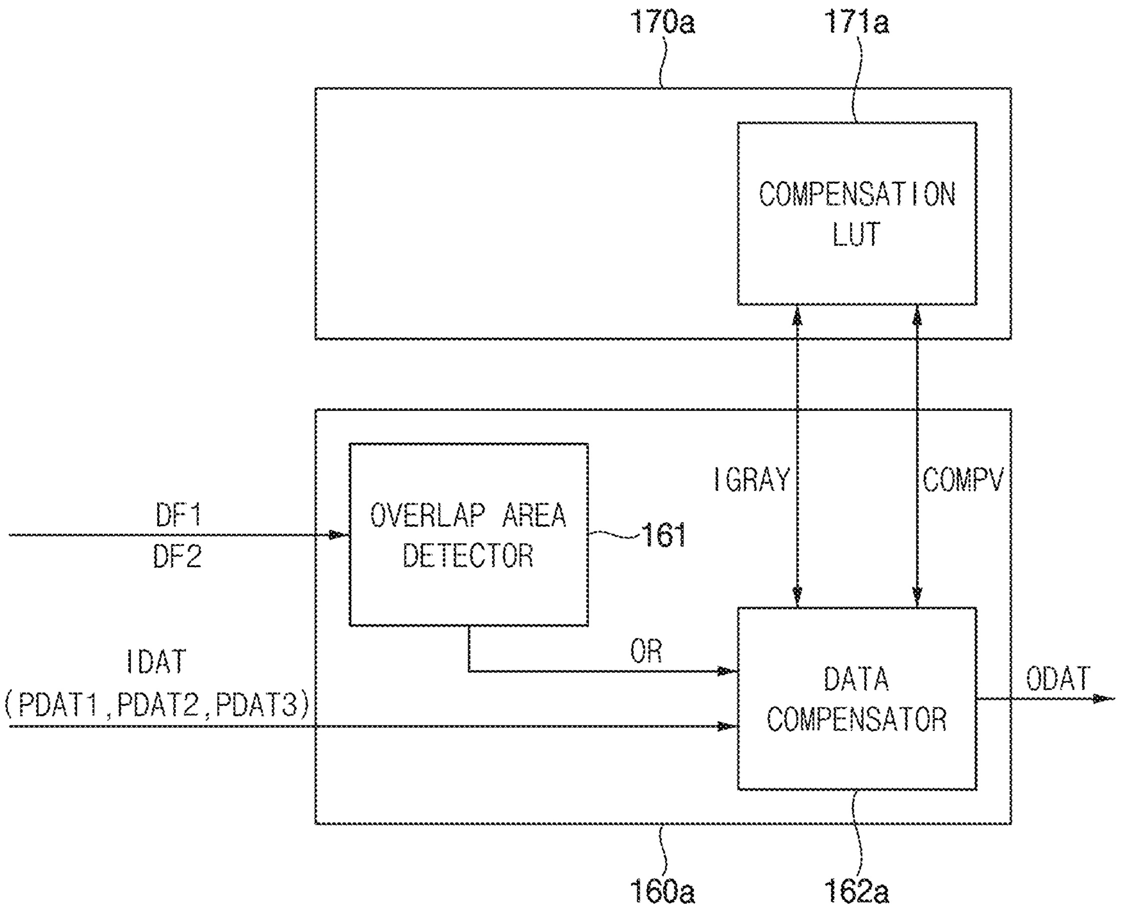
FIG. 11 is a block diagram showing an example of a controller and a memory included in the display device of FIG. 1.

FIG. 11 is a block diagram showing an example of a controller and a memory included in the display device of FIG. 1. FIG. 12 is a view showing an example of a compensation lookup table included in the memory of FIG. 11.

Referring to FIGS. 1 and 11, a controller 160*a* may include an overlap area detector 161 and a data compensator 162*a*. A memory 170*a* may include a compensation lookup table ("LUT") 171*a*.

The overlap area detector 161 may calculate the overlap area OR of the display panel 110 based on the frequency difference between the first driving frequency DF1 corresponding to the first frame period and the second driving frequency DF2 corresponding to the second frame period.

The data compensator 162*a* may compensate for at least one of the first to third pixel data PDAT1, PDAT2, and PDAT3 for the overlap area OR. According to an embodiment, the data compensator 162*a* may compensate for the first pixel data PDAT1 for the overlap area OR by using the compensation LUT 171*a*. In an embodiment, for example, as shown in FIG. 12, the compensation LUT 171*a* may store a plurality of compensation values V1[0] to V1[255] corresponding to a plurality of input gray levels 0 to 255. In an embodiment, for example, the compensation values V1[0] to V1[255] may be greater than 0. The data compensator 162*a* may obtain a compensation value COMPV1 corresponding to an input gray level IGRAY indicated by the first pixel data PDAT1 for the overlap area OR by using the compensation LUT 171*a*, and compensate for the first pixel data PDAT1 for the overlap area OR by adding the compensation value COMPV1 to the input gray level IGRAY. Accordingly, the data driver 120 may increase the voltage level of the first data voltage VDAT1 in the overlap period OP based on the output image data ODAT including the compensated first pixel data. Therefore, as shown in FIG. 9, the luminance deviation between the first pixel PX1 in the overlap area OR and the first pixel PX1 in the non-overlap area NOR may be reduced, and the color deviation between the overlap area OR and the non-overlap area NOR of the display panel 110 may be effectively reduced.

Figure 13:
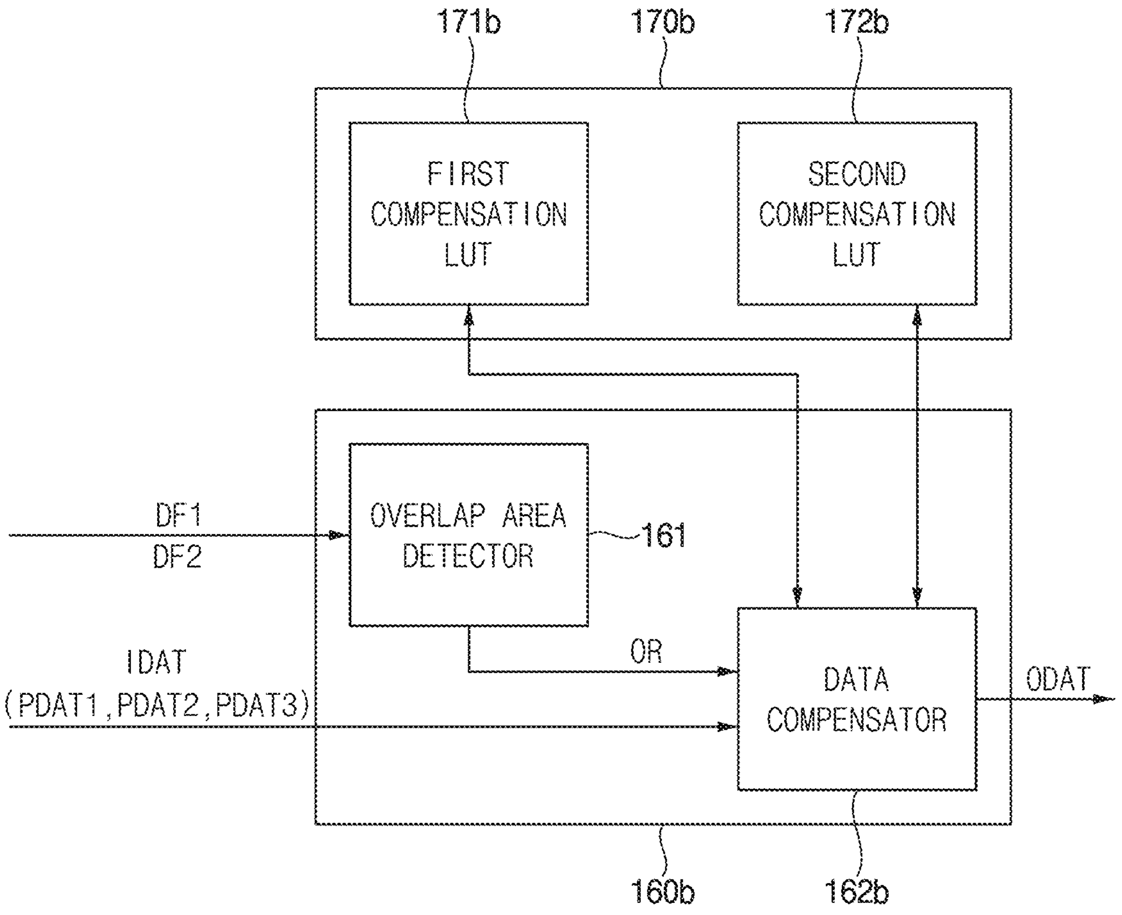
FIG. 13 is a block diagram showing another example of a controller and a memory included in the display device of FIG. 1.

FIG. 13 is a block diagram showing another example of a controller and a memory included in the display device of FIG. 1. FIG. 14 is a view showing an example of first and second compensation lookup tables included in the memory of FIG. 13.

Referring to FIGS. 1 and 13, a controller 160*b* may include an overlap area detector 161 and a data compensator 162*b*. A memory 170*b* may include a first compensation lookup table (LUT) 171*b* and a second compensation lookup table (LUT) 172*b*. Regarding the controller 160*b* and the memory 170*b* that will be described with reference to FIG. 13, descriptions of components that are substantially identical or similar to the components of the controller 160*a* and the memory 170*a* described with reference to FIG. 11 will be omitted.

According to an embodiment, the data compensator 162*b* may compensate for the first pixel data PDAT1 for the overlap area OR by using the first compensation LUT 171*b*, and compensate for the second pixel data PDAT2 for the overlap area OR by using the second compensation LUT 172*b*. In an embodiment, for example, as shown in FIG. 14, the first compensation LUT 171*b* may store a plurality of first compensation values V1[0] to V1[255] corresponding to a plurality of input gray levels 0 to 255, and the second compensation LUT 172*b* may store a plurality of second compensation values V2[0] to V2[255] corresponding to a plurality of input gray levels 0 to 255 and different from the first compensation values V1[0] to V1[255]. In an embodiment, for example, the first compensation values V1[0] to V1[255] and the second compensation values V2[0] to V2[255] may be greater than 0. Accordingly, the data driver 120 may increase the voltage level of the first data voltage VDAT1 and the voltage level of the second data voltage VDAT2 in the overlap period OP based on the output image data ODAT including the compensated first pixel data and the compensated second pixel data. Therefore, as shown in FIG. 10, the luminance deviation between the first pixel PX1 in the overlap area OR and the first pixel PX1 in the non-overlap area NOR and the luminance deviation between the second pixel PX2 in the overlap area OR and the second pixel PX2 in the non-overlap area NOR may be effectively reduced, and the color deviation between the overlap area OR and the non-overlap area NOR of the display panel 110 may be effectively reduced.

Figure 15:
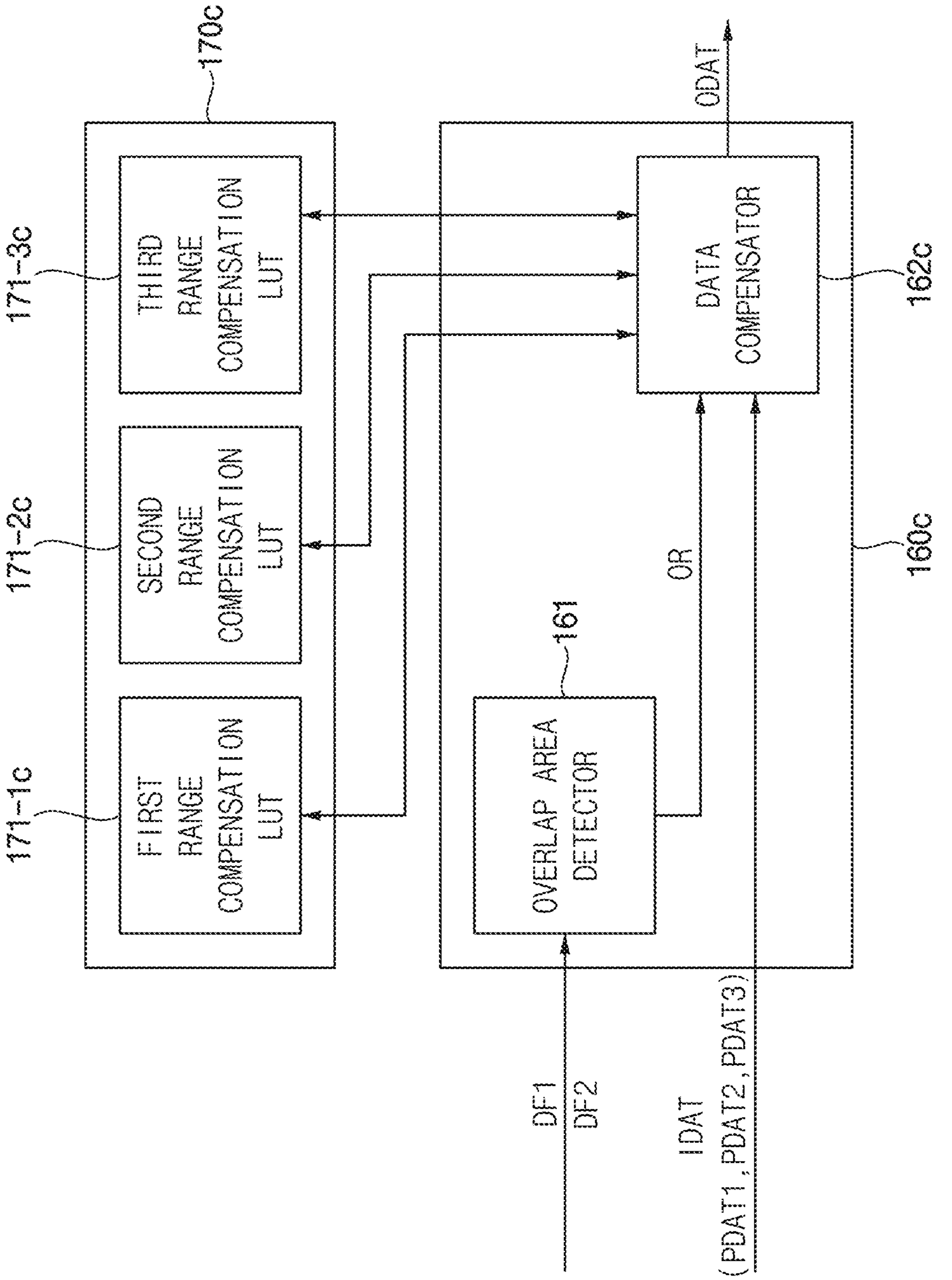
FIG. 15 is a block diagram showing an example of a controller and a memory included in the display device of FIG. 1.

FIG. 15 is a block diagram showing an example of a controller and a memory included in the display device of FIG. 1. FIG. 16 is a view showing an example of a plurality of range compensation lookup tables included in the memory of FIG. 15.

Referring to FIGS. 1 and 15, a controller 160*c* may include an overlap area detector 161 and a data compensator 162*c*. A memory 170*c* may include a plurality of range compensation lookup tables (LUTs). In an embodiment, for example, the memory 170*c* may include a first range compensation lookup table (LUT) 171-1*c*, a second range compensation lookup table (LUT) 171-2*c*, and a third range compensation lookup table (LUT) 171-3*c*, but the number of the range compensation LUTs is not limited thereto. Regarding the controller 160*c* and the memory 170*c* that will be described with reference to FIG. 15, descriptions of components that are substantially identical or similar to the components of the controller 160*a* and the memory 170*a* described with reference to FIG. 11 will be omitted.

According to an embodiment, the data compensator 162*c* may compensate for the first pixel data PDAT1 for the overlap area OR by using the first range compensation LUT 171-1*c* when the frequency difference between the first driving frequency DF1 corresponding to the first frame period and the second driving frequency DF2 corresponding to the second frame period is within a first frequency range, compensate for the first pixel data PDAT1 for the overlap area OR by using the second range compensation LUT 171-2*c* when the frequency difference is within a second frequency range that is different from the first frequency range, and compensate for the first pixel data PDAT1 for the overlap area OR by using the third range compensation LUT 171-3*c* when the frequency difference is within a third frequency range that is different from the first and second frequency ranges. According to an embodiment, the first frequency range may be from about 240 Hz to about 120 Hz, the second frequency range may be from about 120 Hz to about 80 Hz, and the third frequency range may be from about 80 Hz to about 60 Hz. In an embodiment, for example, as shown in FIG. 16, the first range compensation LUT 171-1*c* may store a plurality of first range compensation values V1-1[0] to V1-1[255] corresponding to a plurality of input gray levels 0 to 255, the second range compensation LUT 171-2*c* may store a plurality of second range compensation values V1-2[0] to V1-2[255] corresponding to the input gray levels 0 to 255 and different from the first range compensation values V1-1[0] to V1-1[255], and the third range compensation LUT 171-3*c* may store a plurality of third range compensation values V1-3[0] to V1-3[255] corresponding to the input gray levels 0 to 255 and different from the first range compensation values V1-1[0] to V1-1[255] and the second range compensation values V1-2[0] to V1-2[255]. Accordingly, the first pixel data PDAT1 for the overlap area OR may be compensated for by using the range compensation LUTs 171-1*c*, 171-2*c*, and 171-3*c* that are suitable for the frequency difference between the first driving frequency DF1 and the second driving frequency DF2.

Figure 17:
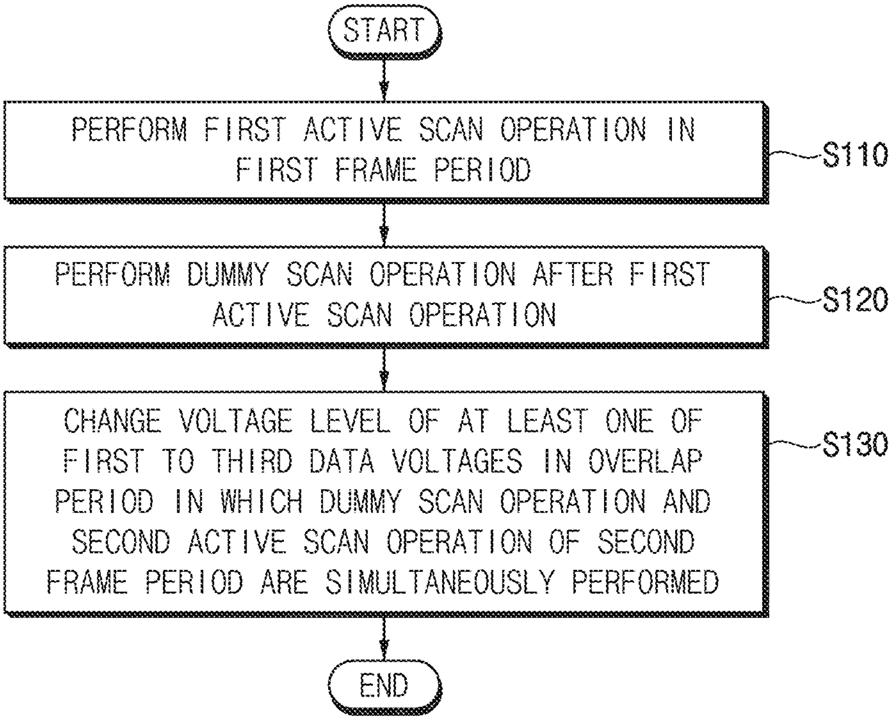
FIG. 17 is a flowchart showing a method for driving a display device according to an embodiment.

FIG. 17 is a flowchart showing a method for driving a display device according to an embodiment.

Referring to FIGS. 1, 2, 9, 10, and 17, a method for driving a display device 100 may include: performing a first active scan operation ASCAN1 of sequentially providing a first scan signal SC and a second scan signal SS to first to third pixels PX1, PX2, and PX3 row by row in a first frame period FP1 corresponding to a first driving frequency (S110); performing a dummy scan operation DSCAN of sequentially providing the second scan signal SS to the first to third pixels PX1, PX2, and PX3 row by row after the first active scan operation ASCAN1 (S120); and changing a voltage level of at least one of first to third data voltages VDAT1, VDAT2, and VDAT3 in an overlap period OP in which the dummy scan operation DSCAN and a second active scan operation ASCAN2 of a second frame period FP2 are simultaneously performed when the dummy scan operation DSCAN is not completed at start of the second frame period FP2 (S130).

In the performing of the first active scan operation ASCAN1 (S110), the scan driver 130 may sequentially output the first and second scan signals SC and SS from first and second scan lines SCL1 and SSL1 for a first pixel row of the display panel 110 to first and second scan lines SCLN and SSLN for an $N^{th}$ pixel row of the display panel 110. In the performing of the dummy scan operation (S120), the scan driver 130 may sequentially output the second scan signal SS from the second scan line SSL1 for the first pixel row to the second scan line SSLN for the $N^{th}$ pixel row.

According to an embodiment, in the changing of the voltage level of at least one of the first to third data voltages VDAT1, VDAT2, and VDAT3 in the overlap period OP (S130), as shown in FIG. 9, the data driver 120 may change the voltage level of the first data voltage VDAT1 in the overlap period OP. For the same gray level, the voltage level of the first data voltage VDAT1 in the overlap period OP may be higher than a voltage level of the first data voltage VDAT1 in a non-overlap period NOP. Accordingly, a luminance deviation between the first pixel PX1 in the overlap area OR and the first pixel PX1 in the non-overlap area NOR may be effectively reduced, and a color deviation between the overlap area OR and the non-overlap area NOR of the display panel 110 may be effectively reduced.

According to an embodiment, in the changing of the voltage level of at least one of the first to third data voltages VDAT1, VDAT2, and VDAT3 in the overlap period OP (S130), as shown in FIG. 10, the data driver 120 may change the voltage level of the first data voltage VDAT1 and the voltage level of the second data voltage VDAT2 in the overlap period OP. For the same gray level, the voltage level of the first data voltage VDAT1 in the overlap period OP may be higher than a voltage level of the first data voltage VDAT1 in a non-overlap period NOP, and, for the same gray level, the voltage level of the second data voltage VDAT2 in the overlap period OP may be higher than a voltage level of the second data voltage VDAT2 in the non-overlap period NOP. Accordingly, a luminance deviation between the first pixel PX1 in the overlap area OR and the first pixel PX1 in the non-overlap area NOR and a luminance deviation between the second pixel PX2 in the overlap area OR and the second pixel PX2 in the non-overlap area NOR may be effectively reduced, and a color deviation between the overlap area OR and the non-overlap area NOR of the display panel 110 may be effectively reduced.

Figure 18:
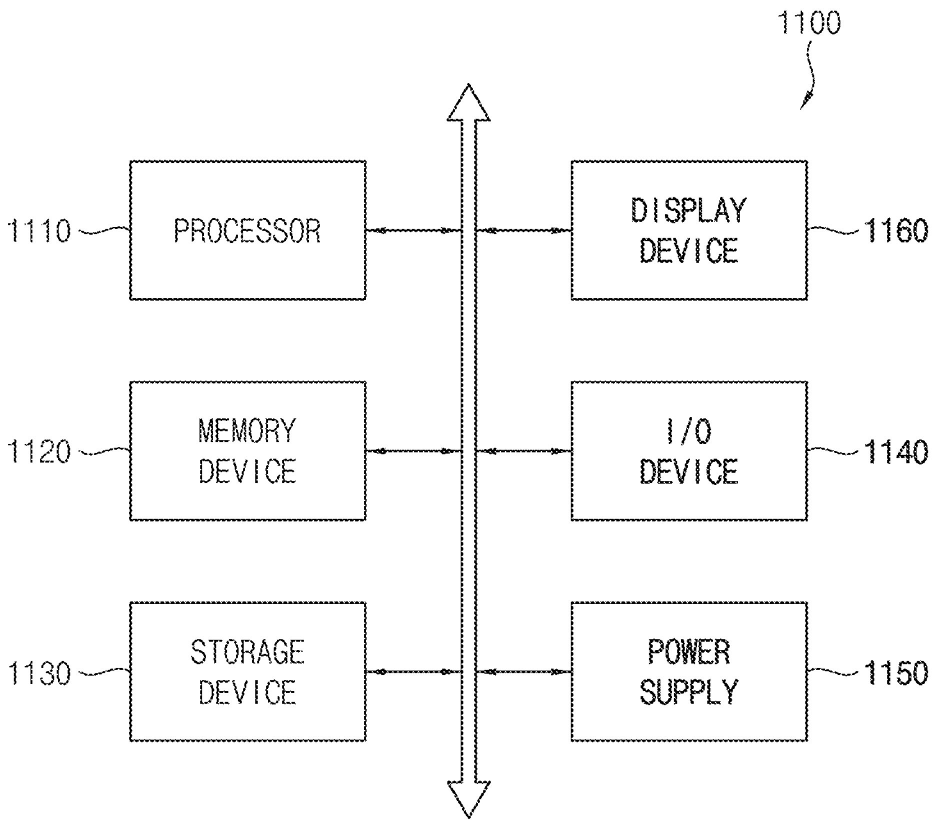
FIG. 18 is a block diagram showing an electronic device including a display device according to an embodiment.

FIG. 18 is a block diagram showing an electronic device including a display device according to an embodiment.

Referring to FIG. 18, an electronic device 1100 may include a processor 1110, a memory device 1120, a storage device 1130, an input/output ("I/O") device 1140, a power supply 1150, and a display device 1160. The electronic device 1100 may further include plurality of ports capable of communicating with a video card, a sound card, a memory card, a USB device, and/or the like, or communicating with other systems.

The processor 1110 may perform specific calculations or tasks. According to an embodiment, the processor 1110 may be a microprocessor, a central processing unit (CPU), or the like. The processor 1110 may be connected to other components through an address bus, a control bus, a data bus, and/or the like. According to an embodiment, processor 1110 may also be connected to an expansion bus such as a peripheral component interconnect ("PCI") bus. According to an embodiment, the processor 1110 may provide input image data (IDAT of FIG. 1) and a control signal CTRL to the display device 1160.

The memory device 1120 may store data for an operation of the electronic device 1100. In an embodiment, for example, the memory device 1120 may include: a nonvolatile memory device such as an erasable programmable read-only memory ("EPROM"), an electrically erasable programmable read-only memory ("EEPROM"), a flash memory, a phase change random access memory ("PRAM"), a resistance random access memory ("RRAM"), a nano-floating gate memory ("NFGM"), a polymer random access memory ("PoRAM"), a magnetic random access memory ("MRAM"), or a ferroelectric random access memory ("FRAM"); and/or a volatile memory device such as a dynamic random access memory ("DRAM"), a static random access memory ("SRAM"), or a mobile DRAM. According to an embodiment, the memory 170 of FIG. 1 may be replaced with the memory device 1120.

The storage device 1130 may include a solid state drive ("SSD"), a hard disk drive ("HDD"), a CD-ROM, and/or the like. The I/O device 1140 may include: an input device such as a keyboard, a keypad, a touch pad, a touch screen, or a mouse; and an output device such as a speaker or a printer. The power supply 1150 may supply a power for the operation of the electronic device 1100. The display device 1160 may be connected to other components through the buses or other communication links. The display device 1160 may correspond to the display device 100 of FIG. 1.

According to the display device 1160, a voltage level of at least one of first to third data voltages may be changed in an overlap period in which a dummy scan operation of a first frame period and a second active scan operation of a second frame period are simultaneously performed. Accordingly, a color deviation between an upper area of a display panel in which pixel rows that receive the first to third data voltages in the overlap period are located and a lower area of the display panel in which pixel rows that receive the first to third data voltages in a non-overlap period in which only the second active scan operation of the second active scan operation and the dummy scan operation is performed after the dummy scan operation is completed are located may be effectively reduced.

The display device according to the embodiments may be applied to a display device included in a computer, a notebook, a mobile phone, a smart phone, a smart pad, a smart watch, a PMP, a PDA, an MP3 player, or the like.

As used in connection with various embodiments of the disclosure, each of the overlap area detector and the data compensator may be implemented in hardware, software, or firmware, for example, implemented in a form of an application-specific integrated circuit (ASIC).

Although the display devices and the methods for driving the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device comprising:

a display panel including a first pixel configured to display a first color, a second pixel configured to display a second color, and a third pixel configured to display a third color;

a data driver configured to provide a first data voltage, a second data voltage, and a third data voltage to the first pixel, the second pixel, and the third pixel, respectively;

a scan driver configured to provide a first scan signal and a second scan signal to each of the first to third pixels; and a controller configured to control the data driver and the scan driver, and receive first pixel data, second pixel data, and third pixel data corresponding to the first data voltage, the second data voltage, and the third data voltage, respectively, wherein each of the first to third pixels is provided in plurality, the scan driver is configured to perform a first active scan operation of sequentially providing the first scan signal and the second scan signal to the first to third pixels row by row in a first frame period corresponding to a first driving frequency, and perform a dummy scan operation of sequentially providing the second scan signal to the first to third pixels row by row after the first active scan operation, and the data driver is configured to change a voltage level of at least one of the first to third data voltages in an overlap period in which the dummy scan operation and a second active scan operation of a second frame period are simultaneously performed when the dummy scan operation is not completed at start of the second frame period corresponding to a second driving frequency different from the first driving frequency.

2. The display device of claim 1, wherein the first color, the second color, and the third color are green, blue, and red, respectively.

3. The display device of claim 2, wherein the data driver is configured to change the voltage level of the first data voltage in the overlap period.

4. The display device of claim 3, wherein, for a same gray level, the voltage level of the first data voltage in the overlap period is higher than a voltage level of the first data voltage in a non-overlap period in which only the second active scan operation of the second active scan operation and the dummy scan operation is performed after the dummy scan operation is completed.

5. The display device of claim 2, wherein the data driver is configured to change both the voltage level of the first data voltage and the voltage level of the second data voltage in the overlap period.

6. The display device of claim 5, wherein, for a same gray level, the voltage level of the first data voltage in the overlap period is higher than a voltage level of the first data voltage in a non-overlap period in which only the second active scan operation of the second active scan operation and the dummy scan operation is performed after the dummy scan operation is completed, and, for the same gray level, the voltage level of the second data voltage in the overlap period is higher than a voltage level of the second data voltage in the non-overlap period.

7. The display device of claim 1, wherein the controller includes:

an overlap area detector configured to calculate an overlap area including overlap pixel rows configured to receive the first and second scan signals in the overlap period among all pixel rows of the display panel based on a frequency difference between the first driving frequency and the second driving frequency; and a data compensator configured to compensate for at least one of the first to third pixel data for the overlap area.

8. The display device of claim 7, wherein the first color, the second color, and the third color are green, blue, and red, respectively.

9. The display device of claim 8, further comprising a compensation lookup table configured to store a plurality of compensation values corresponding to a plurality of input gray levels, wherein the data compensator is configured to obtain a compensation value, of the plurality of compensation values, corresponding to an input gray level, of the plurality of input gray levels, indicated by the first pixel data for the overlap area by using the compensation lookup table, and compensate for the first pixel data for the overlap area by adding the compensation value to the input gray level.

10. The display device of claim 8, further comprising:

a first compensation lookup table configured to store a plurality of first compensation values corresponding to a plurality of input gray levels; and a second compensation lookup table configured to store a plurality of second compensation values corresponding to the input gray levels and different from the first compensation values, wherein the data compensator is configured to compensate for the first pixel data for the overlap area by using the first compensation lookup table, and compensate for the second pixel data for the overlap area by using the second compensation lookup table.

11. The display device of claim 8, further comprising:

a first range compensation lookup table configured to store a plurality of first range compensation values corresponding to a plurality of input gray levels; and a second range compensation lookup table configured to store a plurality of second range compensation values corresponding to the input gray levels and different from the first range compensation values, wherein the data compensator is configured to compensate for the first pixel data for the overlap area by using the first range compensation lookup table when the frequency difference is within a first frequency range, and compensate for the first pixel data for the overlap area by using the second range compensation lookup table when the frequency difference is within a second frequency range different from the first frequency range.

12. The display device of claim 1, wherein the second driving frequency is a non-integer multiple of the first driving frequency when the second driving frequency is greater than the first driving frequency.

13. The display device of claim 1, wherein each of the first to third pixels includes:

a capacitor including a first electrode connected to a first node, and a second electrode connected to a second node;

a first transistor including a gate connected to the first node, a drain configured to receive a first power voltage, and a source connected to the second node;

a second transistor configured to transmit one of the first to third data voltages to the first node in response to the first scan signal;

a third transistor configured to transmit an initialization voltage to the second node in response to the second scan signal; and a light emitting element including an anode connected to the second node, and a cathode configured to receive a second power voltage.

14. A method for driving a display device, the method comprising:

performing a first active scan operation of sequentially providing a first scan signal and a second scan signal to a first pixel configured to display a first color, a second pixel configured to display a second color, and a third pixel configured to display a third color, wherein each of the first to third pixels is provided in plurality, and the first active scan operation is performed to the first to third pixels row by row in a first frame period corresponding to a first driving frequency;

performing a dummy scan operation of sequentially providing the second scan signal to the first to third pixels row by row after the first active scan operation; and changing a voltage level of at least one of a first data voltage, a second data voltage, or a third data voltage provided to the first pixel, the second pixel, and the third pixel, respectively, in an overlap period in which the dummy scan operation and a second active scan operation of a second frame period are simultaneously performed when the dummy scan operation is not completed at start of the second frame period corresponding to a second driving frequency different from the first driving frequency.

15. The method of claim 14, wherein the first color, the second color, and the third color are green, blue, and red, respectively.

16. The method of claim 15, wherein the voltage level of the first data voltage is changed in the overlap period.

17. The method of claim 16, wherein, for a same gray level, the voltage level of the first data voltage in the overlap period is higher than a voltage level of the first data voltage in a non-overlap period in which only the second active scan operation of the second active scan operation and the dummy scan operation is performed after the dummy scan operation is completed.

18. The method of claim 15, wherein both the voltage level of the first data voltage and the voltage level of the second data voltage are changed in the overlap period.

19. The method of claim 18, wherein, for a same gray level, the voltage level of the first data voltage in the overlap period is higher than a voltage level of the first data voltage in a non-overlap period in which only the second active scan operation of the second active scan operation and the dummy scan operation is performed after the dummy scan operation is completed, and, for the same gray level, the voltage level of the second data voltage in the overlap period is higher than a voltage level of the second data voltage in the non-overlap period.

20. The method of claim 14, wherein the second driving frequency is a non-integer multiple of the first driving frequency when the second driving frequency is greater than the first driving frequency.

* * * * *